(12) United States Patent
Pedigo et al.

(10) Patent No.: US 11,110,606 B2
(45) Date of Patent: Sep. 7, 2021

(54) COORDINATING WORK WITHIN A MULTI-ROBOT CELL

(71) Applicant: The Boeing Company, Chicago, IL (US)

(72) Inventors: Samuel F Pedigo, Lake Forest Park, WA (US); Veniamin Tereshchuk, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 16/237,880

(22) Filed: Jan. 2, 2019

(65) Prior Publication Data

US 2020/0206931 A1 Jul. 2, 2020

(51) Int. Cl.
*B25J 9/16* (2006.01)
*B25J 9/00* (2006.01)

(52) U.S. Cl.
CPC ........... *B25J 9/1682* (2013.01); *B25J 9/0084* (2013.01)

(58) Field of Classification Search
CPC .................. B25J 9/1682; B25J 9/0084; G05B 2219/39121; G05B 2219/34348; G05B 19/41815; G05B 19/4065; G05B 2219/37616; G05D 1/0088; G06N 3/008
USPC .................................................. 700/245–264
See application file for complete search history.

(56) References Cited

U.S. PATENT DOCUMENTS

| | | | |
|---|---|---|---|
| 4,577,284 A | 3/1986 | Christy et al. | |
| 4,885,836 A * | 12/1989 | Bonomi | B21J 15/10 29/524.1 |
| 5,204,942 A * | 4/1993 | Otera | G05B 19/4182 700/248 |
| 6,330,495 B1 * | 12/2001 | Kaneko | B25J 9/1671 700/248 |
| 6,365,221 B1 * | 4/2002 | Morton | B05B 13/005 427/140 |
| 6,430,593 B1 | 8/2002 | Lindsley | |
| 6,571,657 B1 * | 6/2003 | Olgado | B25J 9/1638 257/E21.175 |
| 6,615,112 B1 * | 9/2003 | Roos | B25J 9/1692 318/568.1 |

(Continued)

FOREIGN PATENT DOCUMENTS

JP H04266487 A 9/1992

OTHER PUBLICATIONS

European Search Report; Application EP20150051; dated May 25, 2020.

(Continued)

*Primary Examiner* — Jaime Figueroa
(74) *Attorney, Agent, or Firm* — Duft & Bornsen, PC

(57) ABSTRACT

Systems and methods are provided for robot control. One embodiment is a method for coordinating operations of robots performing work on a part. The method includes assigning a group of robots to a part, initiating work on the part via the group of robots, determining that a robot within the group is unable to continue performing work at a first location of the part, removing the robot from the group while other robots of the group continue performing the work, adding a functioning robot to the group at a second location that the robot is scheduled to occupy, and continuing work on the part via the group of robots.

20 Claims, 11 Drawing Sheets

(56) References Cited

U.S. PATENT DOCUMENTS

| | | | |
|---|---|---|---|
| 6,662,083 B2* | 12/2003 | Angel | B23K 37/047 29/430 |
| 6,757,586 B2* | 6/2004 | Milojevic | B25J 9/0084 219/110 |
| 6,804,580 B1* | 10/2004 | Stoddard | B25J 9/1682 700/248 |
| 6,907,318 B2* | 6/2005 | Passmore | B23K 9/287 700/245 |
| 7,024,250 B2* | 4/2006 | Graf | B25J 9/1669 700/19 |
| 7,069,112 B2* | 6/2006 | Graf | B25J 9/1682 700/248 |
| 7,184,423 B2 | 2/2007 | Bryan et al. | |
| 7,682,112 B2* | 3/2010 | Panczuk | B23Q 1/4857 409/132 |
| 7,783,387 B2* | 8/2010 | Calcagno | G05B 19/42 700/264 |
| 7,957,838 B2* | 6/2011 | Poljen | B25J 9/1682 700/264 |
| 8,301,302 B2* | 10/2012 | Sarh | B21J 15/142 700/245 |
| 9,008,839 B1* | 4/2015 | Kuffner, Jr. | G05B 19/4187 700/248 |
| 9,104,197 B2* | 8/2015 | Miegel | G05B 19/425 |
| 9,390,203 B2* | 7/2016 | Miegel | G06F 30/00 |
| 9,821,455 B1* | 11/2017 | Bareddy | B25J 9/1682 |
| 9,937,625 B2* | 4/2018 | Szarski | B25J 9/009 |
| 10,341,413 B2* | 7/2019 | Xu | H04L 67/1095 |
| 2002/0193909 A1* | 12/2002 | Parker | G05B 19/4182 700/259 |
| 2003/0057256 A1* | 3/2003 | Nakamura | B62D 65/02 228/49.1 |
| 2004/0138782 A1* | 7/2004 | Passmore | B23Q 11/08 700/248 |
| 2009/0304940 A1 | 12/2009 | Heldt et al. | |
| 2009/0326711 A1 | 12/2009 | Chang et al. | |
| 2010/0217437 A1* | 8/2010 | Sarh | B64F 5/10 700/248 |
| 2011/0250360 A1 | 10/2011 | Körmoci et al. | |
| 2014/0067108 A1 | 3/2014 | Pedigo et al. | |
| 2015/0005936 A1* | 1/2015 | Ito | B25J 9/1674 700/250 |
| 2017/0057080 A1* | 3/2017 | Krohne | B25J 9/0084 |
| 2017/0153625 A1* | 6/2017 | Yamamoto | B25J 9/1674 |
| 2017/0190119 A1* | 7/2017 | Dow | H04L 67/12 |
| 2018/0021944 A1 | 1/2018 | Schreiber | |
| 2019/0176332 A1* | 6/2019 | Galloway | B25J 9/1674 |
| 2019/0351542 A1* | 11/2019 | Buerger | B25J 9/0084 |
| 2020/0016759 A1* | 1/2020 | Kim | B25J 9/1679 |
| 2020/0061834 A1* | 2/2020 | Kanazawa | G05B 19/4063 |

OTHER PUBLICATIONS

Glibert P R et al; "Scheduling of a Multi-Robot Assembly Cell" Nov. 1, 1990.

* cited by examiner

COORDINATING WORK WITHIN A MULTI-ROBOT CELL

FIELD

The disclosure relates to the field of fabrication, and in particular, to fabrication robots.

BACKGROUND

Robots perform a variety of tasks upon parts in a fabrication environment. These tasks may include drilling, installing fasteners, welding, etc. When fabricating large parts, it is not uncommon for multiple robots to work collaboratively at the same time. When a group of robots perform work together on a part, it remains important that the robots do not collide with each other or the part. Collisions may damage the robots or the part, which may result in costly or time-consuming repairs.

In order to prevent collisions between robots working on the same part, all robots working on the part halt whenever one robot encounters a malfunction. This strategy successfully prevents collisions, but also increases overall downtime. That is, when robots are working collaboratively, if one breaks down then its collaborator robots will not be able to continue working. When a larger number of robots work collaboratively on a part, the amount of downtime at the group dramatically increases. This is because the likelihood of a single robot within the group encountering a malfunction increases as the number of robots in the group increases. There is also a desire to transition robots away from multifunction end effectors that go offline when one function of the robot encounters an error.

Therefore, it would be desirable to have a method and apparatus that take into account at least some of the issues discussed above, as well as other possible issues.

SUMMARY

Embodiments described herein provide enhanced techniques for controlling robots in a manner that prevents collisions, while also allowing robots to continue working on a part after one robot has encountered a malfunction or otherwise become unable to conform its operations with a predefined schedule. The malfunctioning robot is removed in order to prevent collisions, and remaining robots continue to work on the part in accordance with their original schedule for performing work. When a functioning robot replaces the malfunctioning robot, the functioning robot is placed where the malfunctioning robot is currently scheduled to be. Because the functioning robot is placed in an already scheduled location that has been determined to be collision-free, it may continue work intended for the malfunctioning robot without issue.

One embodiment is a method for coordinating operations of robots performing work on a part. The method includes assigning a group of robots to a part, initiating work on the part via the group of robots, determining that a robot within the group is unable to continue performing work at a first location of the part, removing the robot from the group while other robots of the group continue performing the work, adding a functioning robot to the group at a second location that the robot is scheduled to occupy, and continuing work on the part via the group of robots.

A further embodiment is a non-transitory computer readable medium embodying programmed instructions which, when executed by a processor, are operable for performing a method for coordinating operations of robots performing work on a part. The method includes assigning a group of robots to a part, initiating work on the part via the group of robots, determining that a robot within the group is unable to continue performing work at a first location of the part, removing the robot from the group while other robots of the group continue performing the work, adding a functioning robot to the group at a second location that the robot is scheduled to occupy, and continuing work on the part via the group of robots.

Another embodiment is an apparatus for coordinating operations of robots performing work on a part. The apparatus includes a controller that is configured to assign a group of robots to a part, and an interface that is configured to receive updates indicating work performed on the part via the group of robots. The controller is configured to determine that a robot from the group is unable to continue performing work at a first location of the part, direct removal of the robot from the group while other robots of the group continue performing work on the part, add a functioning robot to the group at a second location that the robot is scheduled to occupy, and direct the group to continue work on the part via the robots.

Yet another embodiment is a system for coordinating operations of robots performing work on a part. The system includes a group of robots, a part that the group of robots is scheduled to perform work upon, a controller that is configured to subdivide the part into regions, generate a schedule indicating where and when the group of robots will perform work on the part, and assign the group of robots to a part, and an interface that is configured to receive updates indicating work performed on the part via the group of robots. The controller is configured to determine that a robot from the group is not conforming with a schedule of work at a first location of the part, direct removal of the robot from the group while other robots of the group continue performing work on the part, add a functioning robot to the group at a second location that the robot is scheduled to occupy, and direct the group to continue work on the part via the robots.

A still further embodiment is a method for coordinating operations of robots performing work on a part. The method includes generating a schedule indicating where and when a group of robots will perform work on the part, the schedule including paths for robots that avoid collisions when timed with other robots, assigning the group of robots to the part, initiating work on the part via the group of robots according to the schedule, sampling a progress of the group of robots as the group of robots performs work on the part, and adjusting a speed of the robots based on the determined progress.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

The systems described herein allow labor that would be performed by a robot with a multi-function end effector to be distributed across robots with single function end effectors. This division of labor to single function end effectors significantly increases the number of robots in use, resulting in a desire for synchronized control of the robots in order to avoid collisions. Using single-function end effectors provides a technical benefit because it overcomes problems related to multifunction end effectors breaking down when one function of a robot breaks down. The use of single-function end effectors also enables easier replacement of robots.

Figure 1:
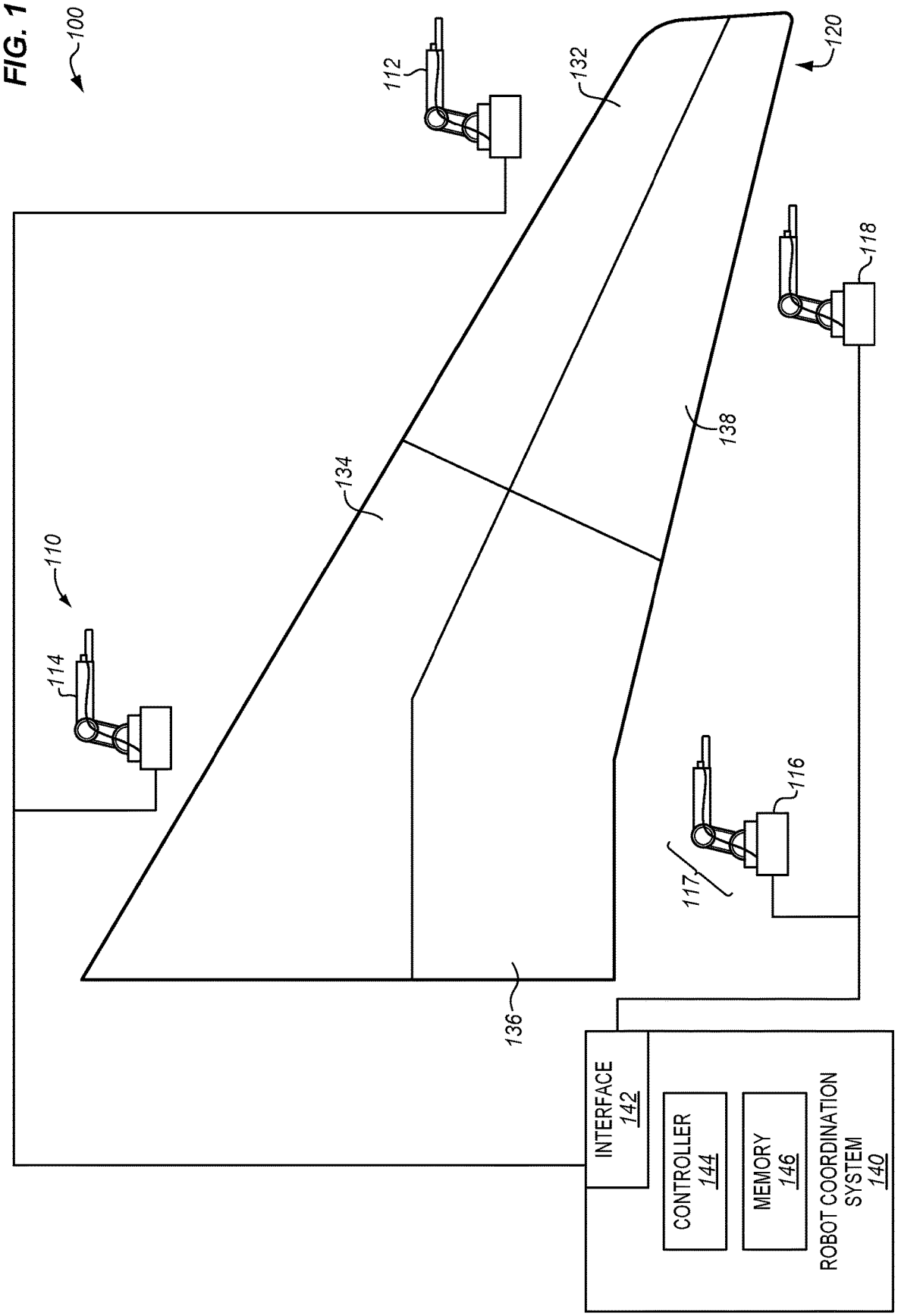
FIG. 1 illustrates a fabrication system for a part in an illustrative embodiment.

FIG. 1 illustrates a fabrication system 100 for a part 120 in an illustrative embodiment. Fabrication system 100 comprises any combination of systems, components, or devices that are operable to utilize robots in order to perform work on part 120 (e.g., a metal part, fiber reinforced composite part, etc.). Fabrication system 100 has been enhanced to coordinate these robots so that work continues uninterrupted on part 120, even when one or more of the robots have malfunctioned or otherwise become unable to continue performing work at the part 120.

In this embodiment, fabrication system 100 includes a group 110 of robots 112, 114, 116, and 118. These robots perform work upon regions 132, 134, 136, and 138, respectively, of part 120 in accordance with directions from robot coordination system 140. The work performed by robots 112-118 in regions 132-138 may comprise drilling, installing fasteners, welding, gluing, inspecting, or other operations. Robots perform actions by controlling their kinematic chains, such as a kinematic chain 117 of robot 116.

Robot coordination system 140 directs the operations of robots 112-118 in order to direct work at part 120 in a timely manner, and also to prevent robots 112-118 from colliding with each other or with part 120. In this embodiment, robot coordination system 140 includes interface 142, which provides instructions and receives updates from robots 112-118 indicating their progress. Interface 142 may comprise a wired communication interface such as an Ethernet interface or Universal Serial Bus (USB) interface, a wireless interface compliant with Wi-Fi or Bluetooth standards, etc.

Controller 144 reviews instructions stored in memory 146 in order to direct the operations of robots 112-118. In embodiments where robots 112-118 include their own internal controllers for repositioning and performing work at part 120, controller 144 may receive error messages or other notifications from robots 112-118. Controller 144 also generates schedules for operating robots 112-118 in tandem. Controller 144 checks and/or revises those schedules to prevent robots 112-118 from colliding during operation. In one embodiment, controller 144 additionally engages in real-time collision checking when directing work, based on updates from robots 112-118. Controller 144 may be implemented, for example, as custom circuitry, as a hardware processor executing programmed instructions, or some combination thereof. Memory 146 may be implemented as a solid state storage device, hard disk, etc.

Controller 144 has been enhanced to continue directing robots to perform work on part 120 even in circumstances where a robot has become unable to continue performing work. That is, if a robot encounters a malfunction or otherwise becomes unable to perform work in accordance with a schedule, controller 144 may continue to direct remaining robots to perform work on part 120. When a functioning robot is acquired, the functioning robot may initiate work at a location where the malfunctioning robot would currently be if it had continued operating normally. The robots then continue operating in accordance with their original schedule. Since the original schedule has already been checked to ensure that no collisions are present, the rest of the schedule may be run without any concern of collisions.

Illustrative details of the operation of fabrication system 100 will be discussed with regard to FIG. 2. Assume, for this embodiment, that part 120 has been placed among robots 112-118 and awaits the performance of work in order for fabrication to be completed.

Figure 2:
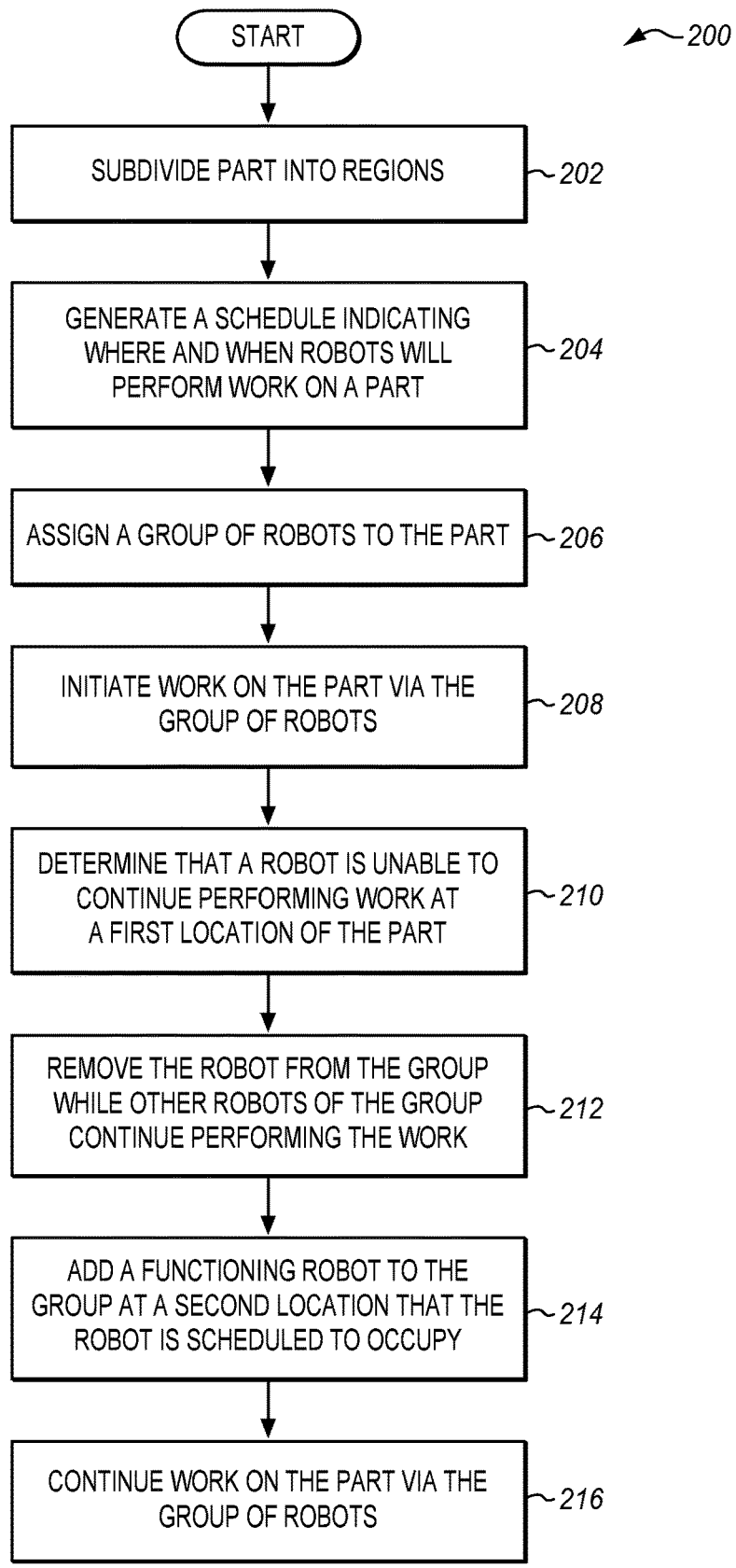
FIG. 2 is a flowchart illustrating a method for coordinating operations of robots in a fabrication system in an illustrative embodiment.

FIG. 2 is a flowchart illustrating a method 200 for coordinating operations of robots in a fabrication system in an illustrative embodiment. The steps of method 200 are described with reference to fabrication system 100 of FIG. 1, but those skilled in the art will appreciate that method 200 may be performed in other systems. The steps of the flowcharts described herein are not all inclusive and may include other steps not shown. The steps described herein may also be performed in an alternative order.

With part 120 in place, controller 144 subdivides the part 120 into regions 132-138 in step 202, and generates a schedule indicating where and when robots 112-118 will perform work on part 120 in step 204. Regions 132-138 are defined by controller 144 as contiguous portions of part 120, and may comprise regions of the same size, regions expected to take the same amount of time for work to be completed by a robot, etc. In one embodiment, the schedule generated by controller 144 comprises one or more Numerical Control (NC) programs for robots 112-118. Controller 144 confirms that running the schedule will not result in any predicted potential collisions, and proceeds to step 202.

In step 206, controller 144 assigns a group 110 of robots 112-118 to part 120. In one embodiment, this includes assigning each of robots 112-118 to one of regions 132-138 of part 120. For example, controller 144 may provide a different NC program to each robot, based on the region in which that robot is located.

In step 208, controller 144 initiates work on the part 120 via the group 110 of robots. For example, controller 144 may initiate operations at each of robots 112-118 in accordance with a predefined schedule that synchronizes movements of the robots in order to assure collision avoidance. In some embodiments, controller 144 awaits further updates from the robots indicating their progress. In further embodiments, controller 144 selectively pauses, delays, or speeds up work at certain robots depending on their progress, in order to ensure that the robots continue operating in synchrony as dictated by the schedule. For example, if one robot has completed an operation faster than expected, controller 144 may briefly pause that robot in order to ensure that the robot continues to conform with the schedule, which is known to be collision free.

Progress continues on the part 120 as robots 112-118 continue to perform work. At some point in time, one of the robots encounters a condition that prevents it from being able to continue performing work on the part 120 in accordance with the schedule. For example, a robot may detect that it has broken or worn-down tooling that requires replacement, a robot may move to an unexpected position and halt, a robot may fail to perform work owing to a positioning error, the robot may encounter a runtime error, a robot may be in need of maintenance, etc. In any circumstance, this condition causes the robot to either halt work or to continue working at an undesirably reduced rate.

Because the robots 112-118 are each expected to perform their tasks on schedule along a predefined path that has already been crafted to prevent collisions, the malfunctioning robot presents a problem. If the robot can return to performing work in accordance with the schedule, then this problem may be corrected and work may continue. However, if the robot cannot return to performing work in accordance with the schedule, continued operation of the robot results in an unknown risk of collision with other robots. To this end, it is desirable to remove the robot before a collision occurs. After the robot has been removed, the remaining robots may continue in accordance with the schedule without risk of collision. The robot may then be replaced at a later time.

Figure 3:
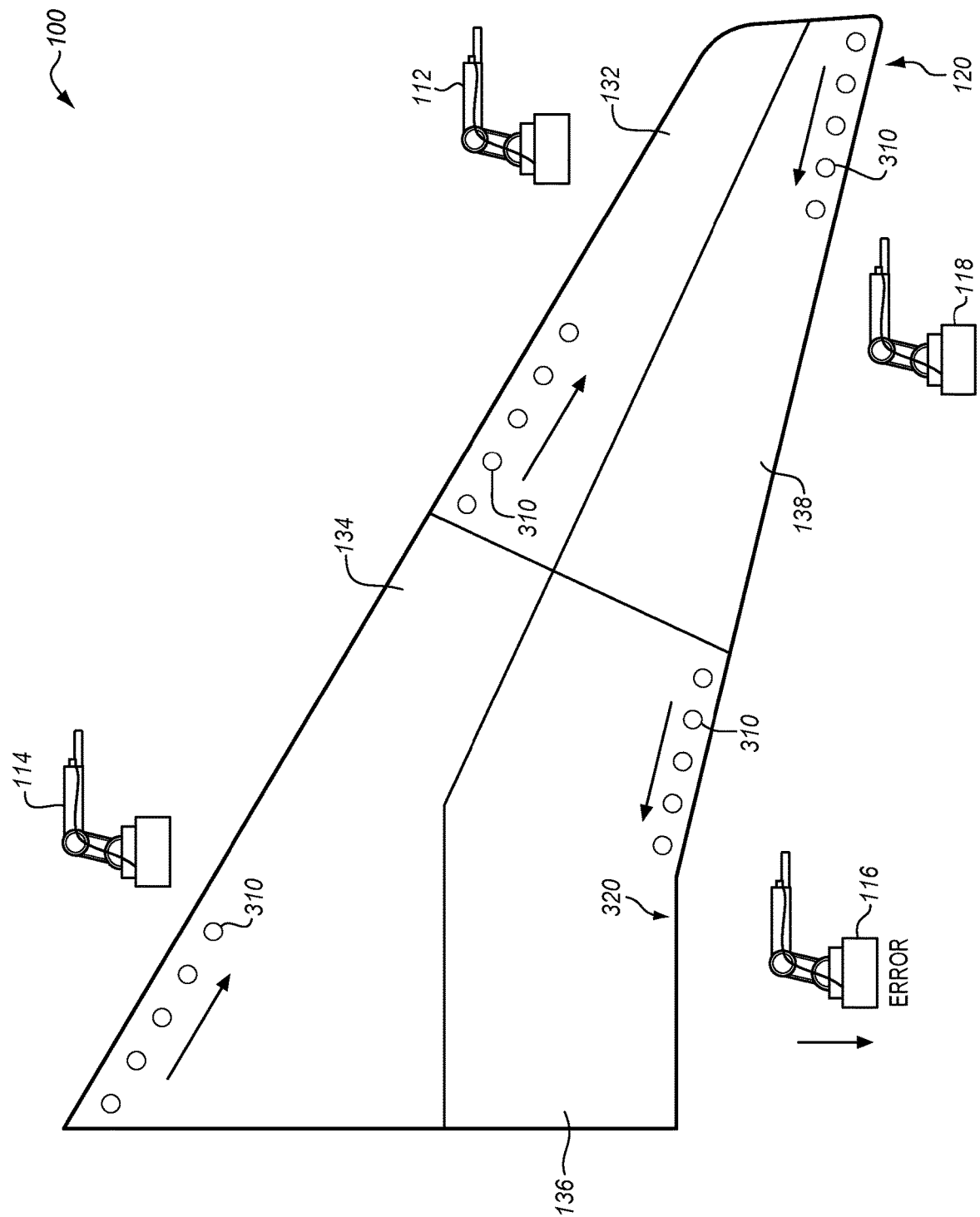
FIGS. 3-5 illustrate removal and replacement of a malfunctioning robot in a fabrication system in an illustrative embodiment.

In step 210, controller 144 determines that a robot is unable to continue performing work at a first location in one of the regions of the part. As used herein, a robot may be considered to be "malfunctioning" if it cannot continue to perform work in accordance with its schedule (i.e., if it cannot continue to conform with its schedule of work). This may be caused due to an error at an end effector of the robot, an error at an actuator that moves the robot, an error at a controller of the robot, etc. This determination may be based on an update received from the robot indicating a positioning or other error, may be based on the robot not reporting a confirmation to controller 144, due to a notification from a technician, etc. For example, in FIG. 3, robot 116 may encounter a malfunction at first location 320 after work 310 has been performed on part 120.

Upon detection of the robot that is unable to continue performing work in accordance with the schedule, the robot is removed from the group (e.g., physically and functionally) in step 212 while other robots of the group continue performing the work. For example, the robot may be physically removed from part 120. The robot may then be repaired to become a functioning robot, or may be replaced with a functioning robot.

Figure 4:
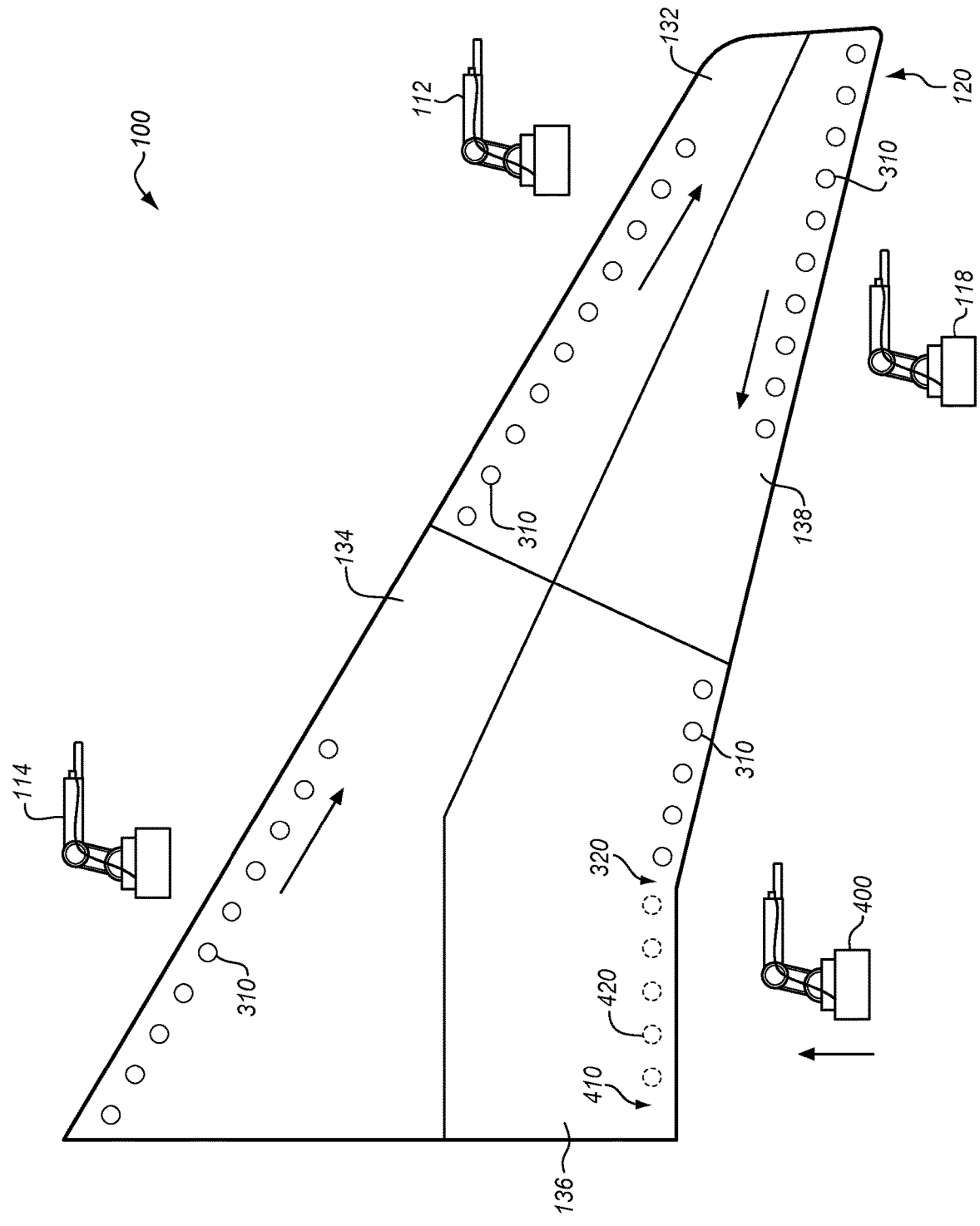

After a functioning robot has become available, in step 214 the functioning robot is added to the group at a second location in the region that the malfunctioning robot is scheduled to occupy. The second location is the location that the malfunctioning robot would currently occupy if the malfunctioning robot had been able to continue performing work on the part. For example, as shown in FIG. 4, a functioning robot 400 is placed at second location 410. Second location 410 is distinct from first location 320, and one or more instances of work 420 between first location 320 and second location 410 have not yet been completed. However, because the functioning robot 400 is placed at the location that is expected by the schedule, no collision checking or alteration of the schedule is required. That is, the functioning robot takes up collaboration spacing with the other robots where the malfunctioning robot would have been if it had not dropped out/been removed.

Figure 5:
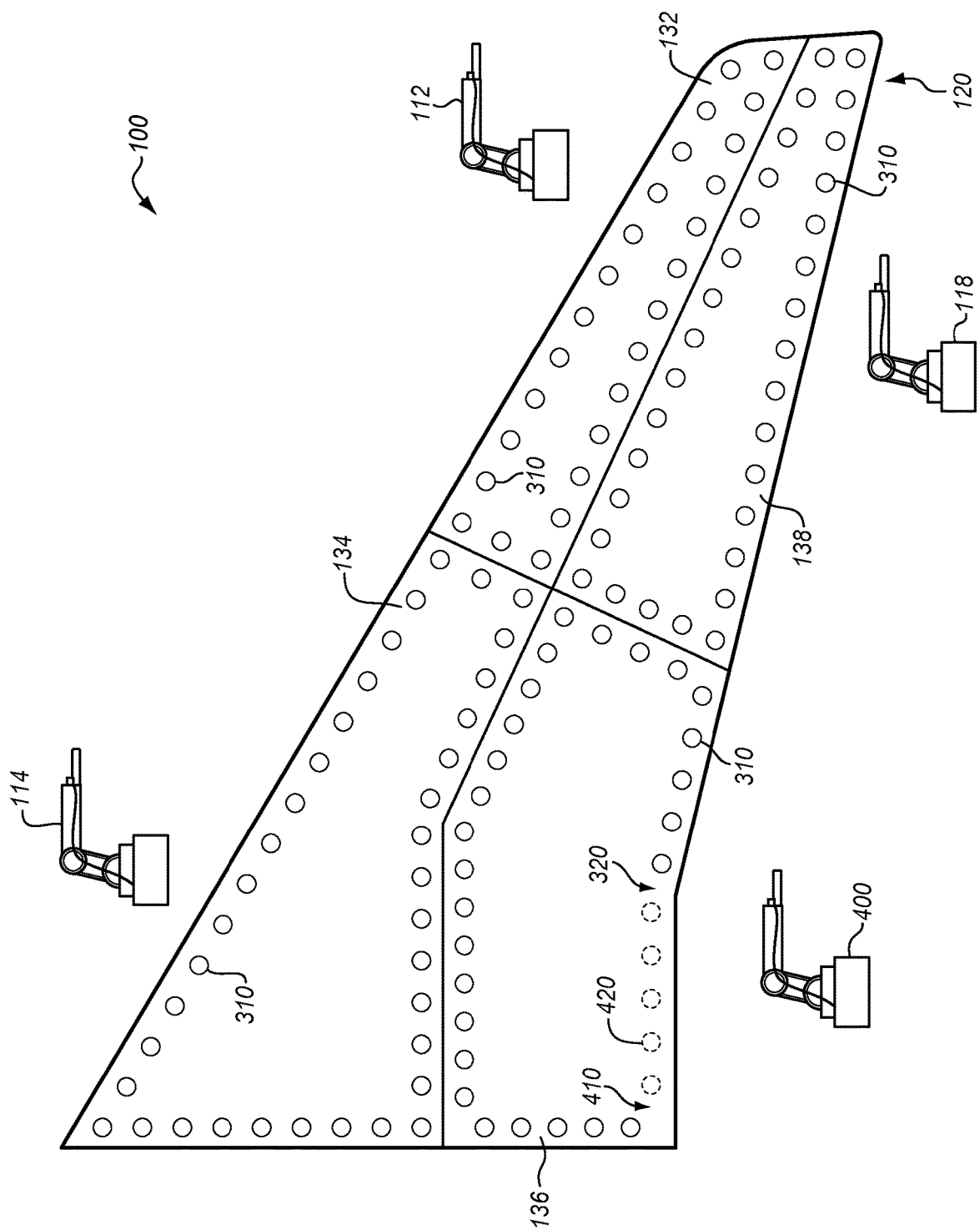

In step 216, the group 110 of robots continue work on regions 132-136 of part 120. This may proceed until the schedule determined by controller 144 has been completed. For example, as shown in FIG. 5, each robot may continue performing work across the part 120. Method 200 may be repeated to perform additional work on the part 120, or even to perform different kinds of work on the part 120.

Method 200 provides a technical benefit over prior techniques, because it enables robots to continue operating according to a predetermined schedule when they are working on a part. This reduces downtime when operating on the part, and reduces the amount of processing resources needed for collision avoidance checking.

Figure 6:
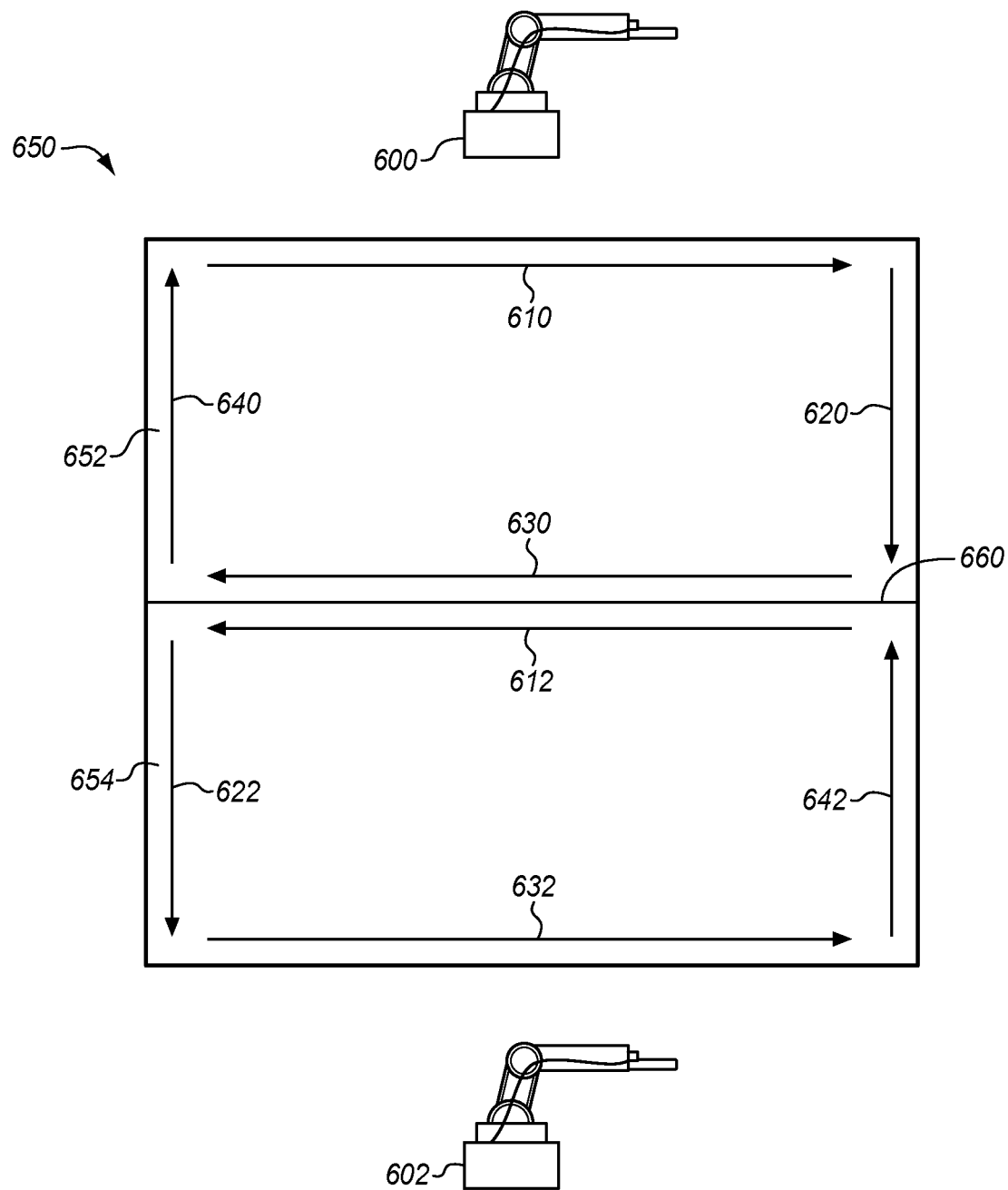
FIG. 6 is a diagram illustrating coordinated movements between robots in different regions of a part in an illustrative embodiment.

The following FIGS. provide additional details of scheduling and collision avoidance in illustrative embodiments. FIG. 6 is a diagram illustrating coordinated movements between robots in different regions of a part 650 in an illustrative embodiment. Robot 600 performs work within region 652 along path 610, followed by path 620, path 630, and path 640. Meanwhile, robot 602 performs work within region 654 along path 612, followed by path 622, path 632, and path 642. This means that robot 600 and robot 602 remain on opposite sides of their respective regions during work. It also means that robot 600 and robot 602 do not perform work at a shared edge 660 of region 652 and region 654 (which are adjacent) at the same time.

Figure 7:
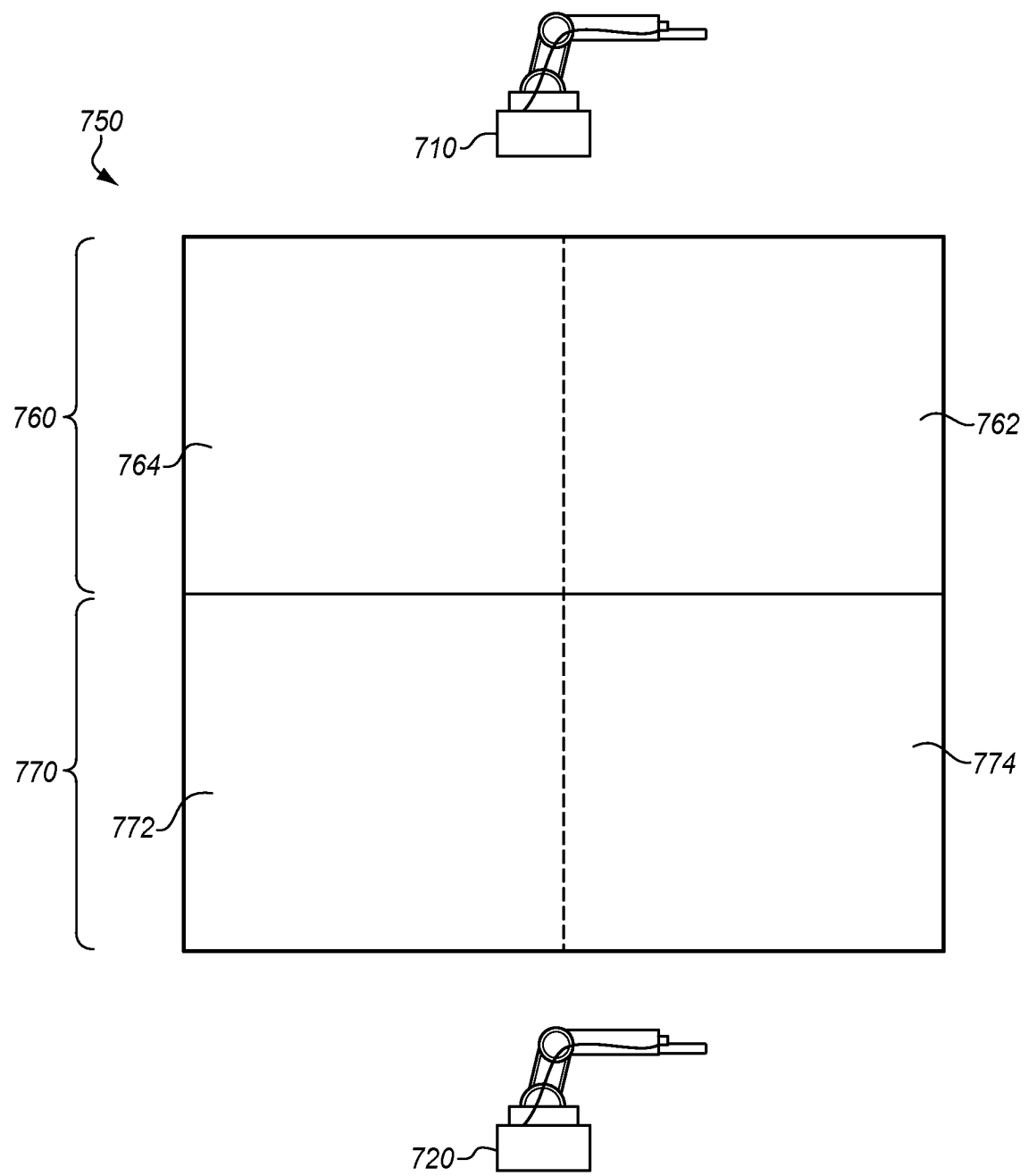
FIG. 7 is a diagram illustrating regions of a part that have been divided into sections in an illustrative embodiment.

FIG. 7 is a diagram illustrating regions of a part 750 that have been divided into sections in an illustrative embodiment. In this embodiment, part 750 includes region 760 and region 770. Region 760 is worked upon by robot 710, while region 770 is worked upon by robot 720. Region 760 is subdivided into section 762 and section 764. Region 770 is subdivided into section 772 and section 774. Robot 710 performs work starting in section 762, and then section 764. Meanwhile, robot 720 performs work starting in section 772, and then in section 774. According to this scheduling technique, robots continue to work in sections that are not adjacent, which reduces a likelihood of collision during fabrication. Controller 144 may therefore coordinate movement of the robots along the sections in a manner that prevents the robots from operating at the same time in sections that are directly adjacent.

Figure 8:
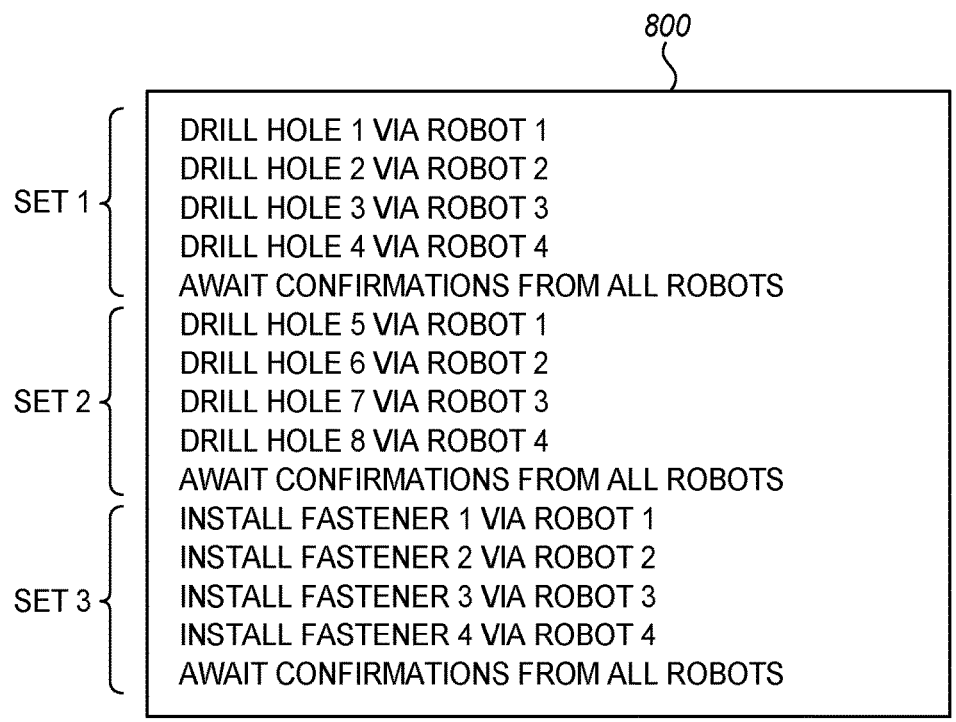
FIG. 8 is a block diagram of a schedule in an illustrative embodiment.

FIG. 8 is a block diagram of a schedule 800 in an illustrative embodiment. In this embodiment, schedule 800 is provided in the form of instructions for an NC program that is operated by controller 144. The instructions are for operations performed by each of multiple robots. Upon transmitting instructions for a set of operations (e.g., set 1, set 2, set 3) controller 144 pauses until the robots have confirmed completion of the operations. Upon receiving a confirmation from each robot, the controller 144 proceeds to provide a next set of instructions from the schedule 800. In further embodiments, schedules may be distributed across the robots for independent operation, may be performed without pausing, or may be implemented in any other suitable fashion. Controller 144 therefore independently determines what functions are to be performed by each robot, and where those functions will be performed. Controller 144 also determines a path for each robot that avoids collisions by performing the work at known timings. In further embodiments, Controller 144 periodically samples the progress of each of the robots to ensure that the schedule is being maintained.

Figure 9:
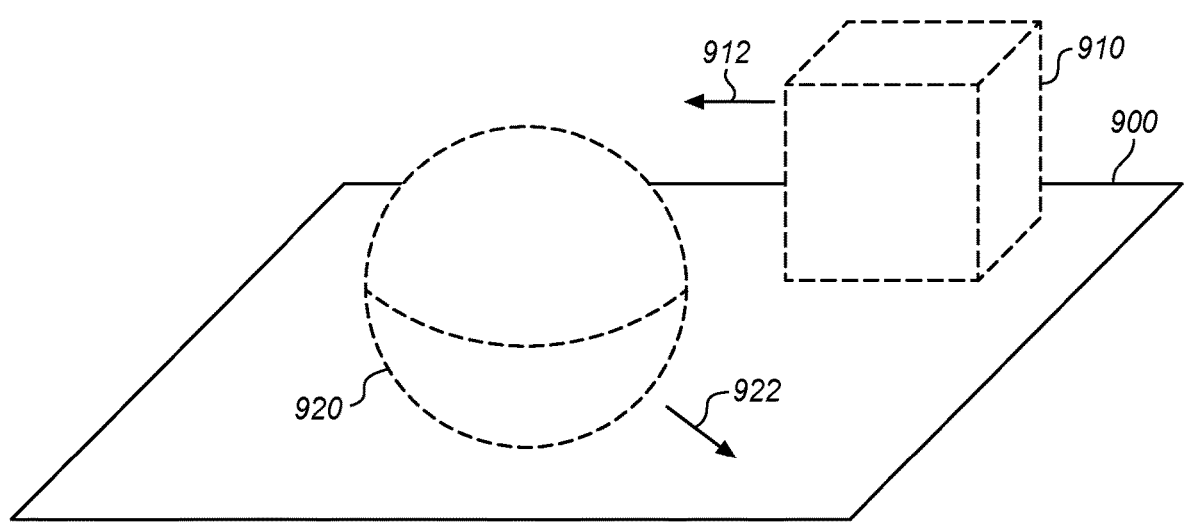
FIG. 9 is a diagram illustrating a collision avoidance model for robots in a fabrication system in an illustrative embodiment.

FIG. 9 is a diagram illustrating a collision avoidance model for robots in a fabrication system in an illustrative embodiment. According to FIG. 9, each robot is modeled as a volume, such as volume 910 or volume 920. The path 912 of volume 910 and path 922 of volume 920 across part 900 is also modeled. When checking a schedule for potential collisions, Controller 144 determines volumes occupied by the robots during the work based on the schedule. Controller 144 then compares volumes occupied by different robots over time to detect potential collisions, and reports any potential collisions that were detected. If any potential collisions are detected, controller 144 may also flag the schedule as unacceptable.

In further embodiments, controller 144 detects potential collisions between the robots based on current positions, speeds, and tasks of the robots, and reports any potential collisions that were detected. For example, one robot may drill the holes in a region while another robot inspects drilled holes in another region, while another robot installs pins into drilled and inspected holes in yet another region, all the while avoiding collisions due to scheduling and real-time control. This form of real-time collision checking may be implemented as a supplement to the schedule-based collision checking discussed above. The real-time collision checking provides a technical benefit by preventing collisions that would otherwise occur when a robot is not positioned where a schedule expects the robot to be.

EXAMPLES

In the following examples, additional processes, systems, and methods are described in the context of a fabrication system for a part.

Figure 10:
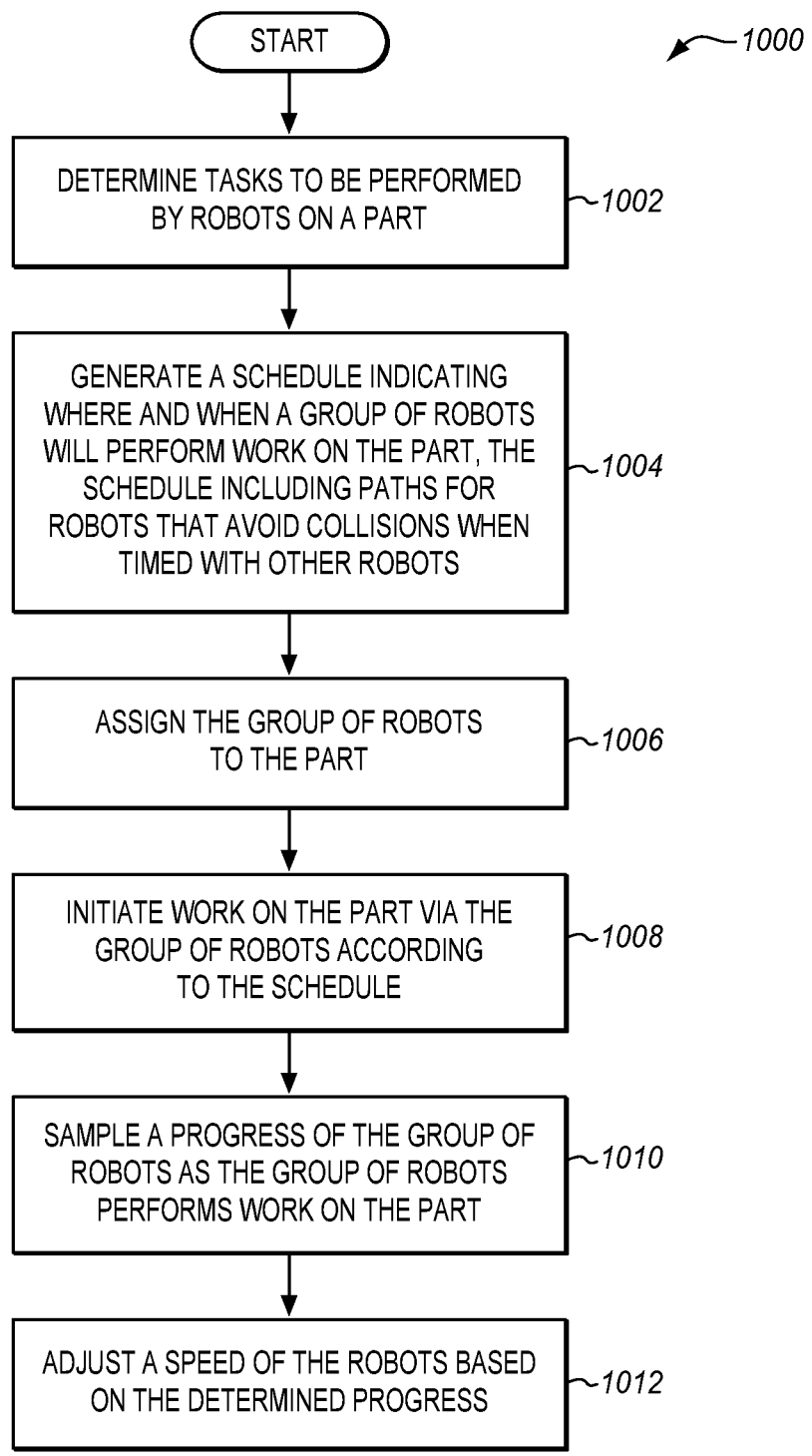
FIG. 10 is a flowchart illustrating a method for coordinating operations of robots in a fabrication system in an illustrative embodiment.

FIG. 10 is a flowchart illustrating a method 1000 for coordinating operations of robots in a fabrication system in an illustrative embodiment. Method 1000 includes controller 144 determining tasks to be performed by each of multiple robots in step 1002. This may include determining what tasks are to be by robots on a part (e.g., drilling, inspecting, etc.) and where those tasks are to be accomplished. In step 1004, controller 144 generates a schedule indicating where and when a group of robots will perform work on the part. The schedule includes paths for robots that avoid collisions when timed with other robots. Thus, controller 144 confirms that when operating in accordance with the schedule, movements of robots within the group are coordinated to prevent collision. In step 1006, controller 144 assigns the group of robots to the part. For example, if the part is subdivided into regions, controller 144 may assign a different robot in the group to each of the regions. In step 1008, controller 144 initiates work on the part via the group of robots according to the schedule. For example, controller 144 may provide instructions to the robots in a timed manner in order to ensure compliance with the schedule. In step 1010, controller 144 samples a progress of the robots as the group of robots performs work on the part. For example, this may include receiving input from each robot indicating its current status and/or location. In step 1012, controller 144 adjusts a speed of one or more of the robots in the group based on the determined progress. For example, if some robots are proceeding more slowly than expected, controller 144 may either speed up these robots or slow down other robots in the group in order to ensure that the schedule is adhered to.

Figure 11:
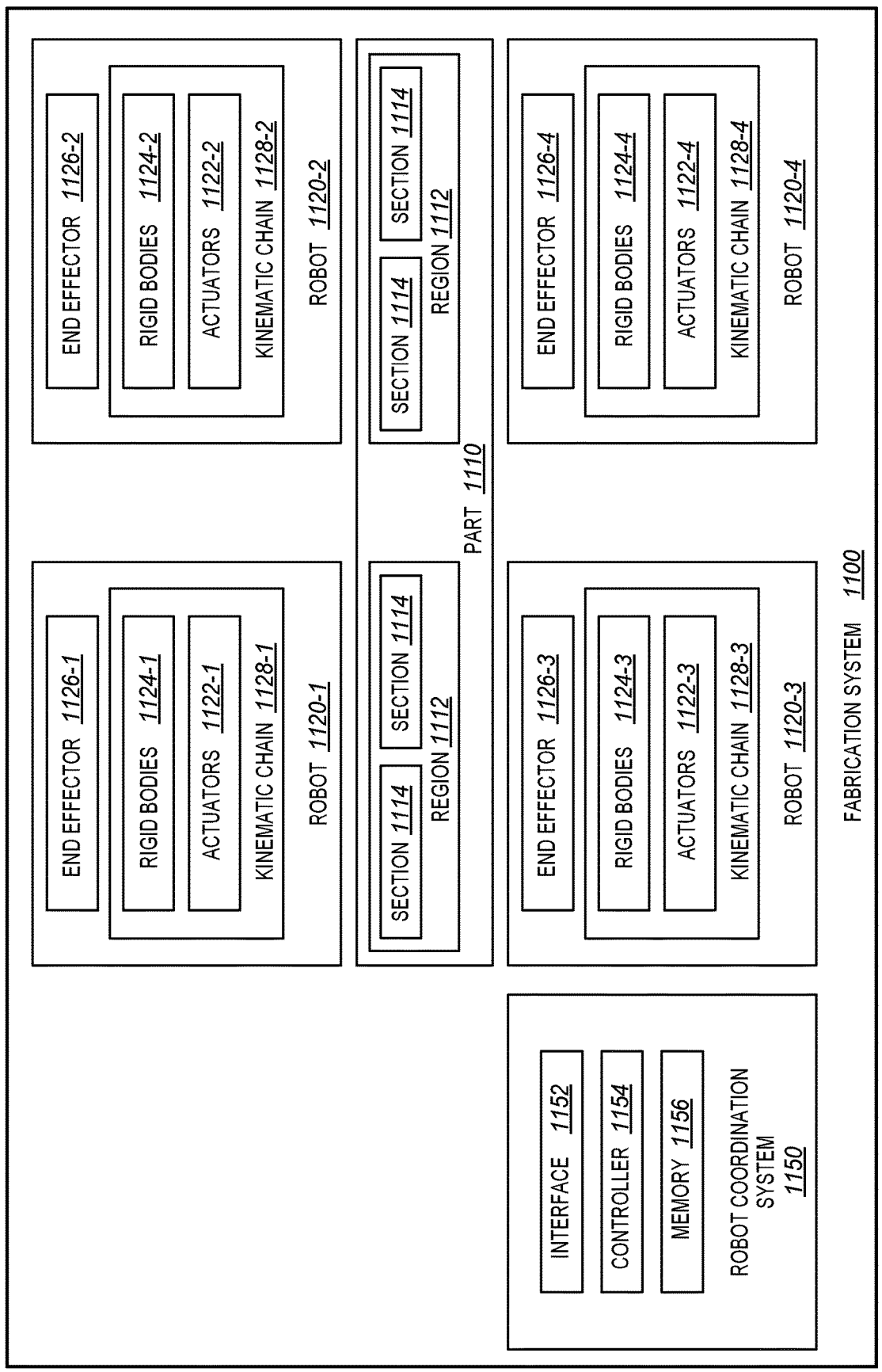
FIG. 11 is a block diagram of a fabrication system in an illustrative embodiment.

FIG. 11 is a block diagram of a fabrication system 1100 in an illustrative embodiment. Fabrication system 1100 operates on part 1110, which is divided into regions 1112 and sections 1114. In this embodiment, fabrication system 1100 includes robots 1120-1 through 1120-4, which include rigid bodies 1124-1 through 1124-4 that are repositioned by actuators 1122-1 through 1122-4 within kinematic chains 1128-1 through 1128-4. End effectors 1126-1 through 1126-4 perform work at robots 1120-1 through 1120-4, such as drilling or installing fasteners. Fabrication system 1100 also includes robot coordination system 1150. Robot coordination system 1150 includes an interface 1152 that is coupled for communication with robots 1120. Controller 1154 manages the operations of robots 1120 based on input from interface 1152, and accesses memory 1156 to store schedules and collision avoidance logic.

Figure 12:
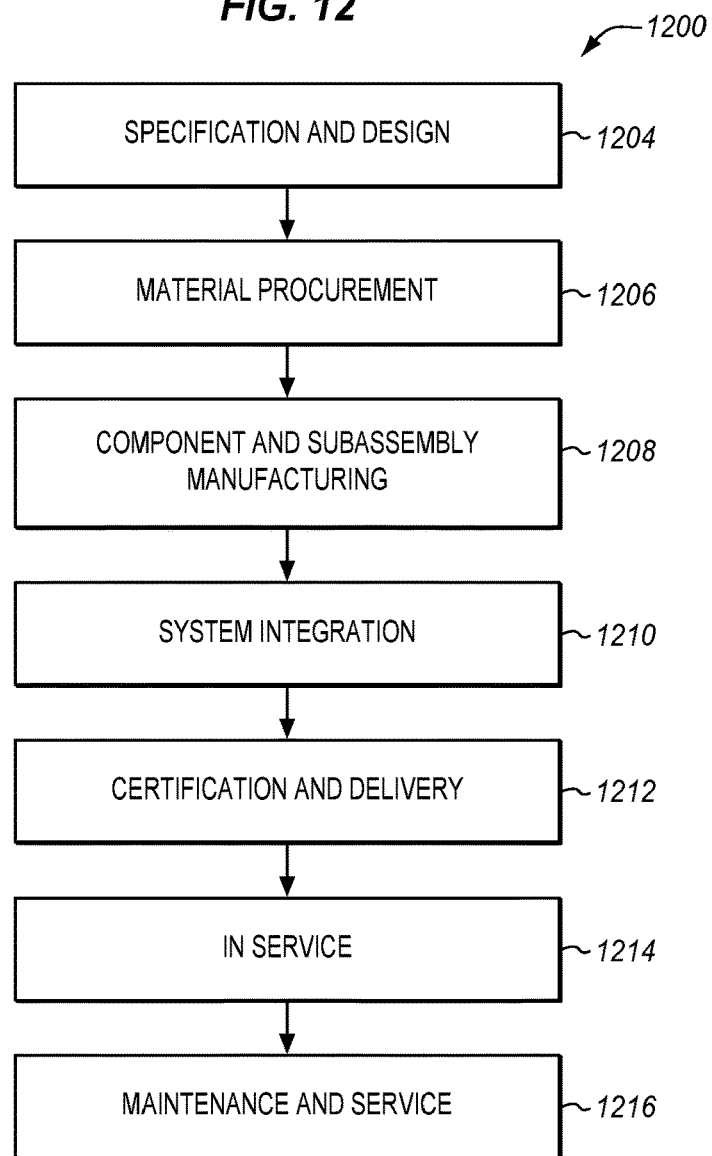
FIG. 12 is a flow diagram of aircraft production and service methodology in an illustrative embodiment.
Figure 13:
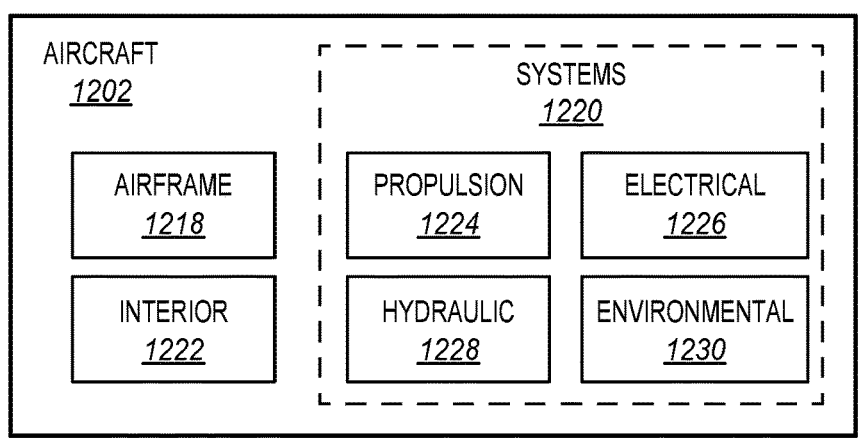
FIG. 13 is a block diagram of an aircraft in an illustrative embodiment.

Referring more particularly to the drawings, embodiments of the disclosure may be described in the context of aircraft manufacturing and service in method 1200 as shown in FIG. 12 and an aircraft 1202 as shown in FIG. 13. During pre-production, method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine work in maintenance and service 1216 (which may also include modification, reconfiguration, refurbishment, and so on). Apparatus and methods embodied herein may be employed during any one or more suitable stages of the production and service described in method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion system 1224, electrical system 1226, hydraulic system 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by method 1200 may include an airframe 1218 with a plurality of systems 1220 and an interior 1222. Examples of systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1200. For example, components or subassemblies corresponding to component and subassembly manufacturing 1208 may be fabricated or manufactured in a manner similar to components or subassemblies produced while the aircraft 1202 is in service. Also, one or more apparatus embodiments, method embodiments, or a combination thereof may be utilized during the subassembly manufacturing 1208 and system integration 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation during the maintenance and service 1216. For example, the techniques and systems described herein may be used for material procurement 1206, component and subassembly manufacturing 1208, system integration 1210, service 1214, and/or maintenance and service 1216, and/or may be used for airframe 1218 and/or interior 1222. These techniques and systems may even be utilized for systems 1220, including, for example, propulsion system 1224, electrical system 1226, hydraulic 1228, and/or environmental system 1230.

In one embodiment, a part comprises a portion of airframe 1218, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout component and subassembly manufacturing 1208 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for coordinating operations of robots performing work on a part, the method comprising:
assigning a group of robots to a part;
initiating work on the part via the group of robots;
determining that a first robot within the group is unable to continue performing work at a first location of the part;
removing the first robot from the first location and the group while other robots of the group continue performing the work;
adding a functioning robot to the group at a second location of the part that the first robot was scheduled to occupy during the work; and
continuing work on the part via the group of robots.

2. The method of claim 1 wherein:
working on the part via the group of robots comprises performing adjustments to a kinematic chain at of each of the robots.

3. The method of claim 1 wherein:
the part is subdivided into regions, and the method further comprises:
subdividing each region into multiple sections; and
coordinating movement of the group of robots along the sections in a manner that prevents the robots from operating at the same time in sections that are directly adjacent.

4. The method of claim 1 further comprising:
identifying a schedule for the group of robots;
determining volumes occupied by different robots during the work based on the schedule;
comparing volumes occupied by different robots over time to detect potential collisions; and
reporting any potential collisions that were detected.

5. The method of claim 1 further comprising:
detecting potential collisions between robots in the group based on current positions, speeds, and tasks of robots; and
reporting any potential collisions that were detected.

6. The method of claim 1 further comprising:
subdividing the part into regions that are contiguous portions of the part and that do not overlap; and
assigning each robot in the group to a different region of the part.

7. The method of claim 6 further comprising:
moving each robot in the group through its assigned region such that robots in two adjacent regions do not occupy a shared edge of the two adjacent regions at the same time.

8. The method of claim 1 further comprising:
repairing the first robot to turn the robot into the functioning robot; and
continuing work on the part with the group of robots while repairing the first robot.

9. A portion of an aircraft assembled according to the method of claim 1.

10. A non-transitory computer readable medium embodying programmed instructions which, when executed by a processor, are operable for performing a method for coordinating operations of robots performing work on a part, the method comprising:
assigning a group of robots to a part;
initiating work on the part via the group of robots;
determining that a first robot within the group is unable to continue performing work at a first location of the part;
removing the first robot from the first location and the group while other robots of the group continue performing the work;
adding a functioning robot to the group at a second location of the part that the first robot was scheduled to occupy during the work; and
continuing work on the part via the group of robots.

11. The medium of claim 10 wherein:
working on the part via the group of robots comprises performing adjustments to a kinematic chain at of each of the robots.

12. The medium of claim 10 wherein the method further comprises:
the part is subdivided into regions, and the method further comprises:
subdividing each region into multiple sections; and
coordinating movement of the group of robots along the sections in a manner that prevents the robots from operating at the same time in sections that are directly adjacent.

13. The medium of claim 10 wherein the method further comprises:
identifying a schedule for the group of robots;
determining volumes occupied by different robots during the work based on the schedule;
comparing volumes occupied by different robots over time to detect potential collisions; and
reporting any potential collisions that were detected.

14. The medium of claim 10 wherein the method further comprises:
detecting potential collisions between robots in the group based on current positions, speeds, and tasks of robots; and
reporting any potential collisions that were detected.

15. The medium of claim 10 wherein:
subdividing the part into regions that are contiguous portions of the part and that do not overlap; and
assigning each robot in the group to a different region of the part.

16. The medium of claim 14 wherein the method further comprises:
moving each robot in the group through its assigned region such that robots in two adjacent regions do not occupy a shared edge of the two adjacent regions at the same time.

17. The medium of claim 10 wherein the method further comprises:
repairing the robot to turn the first robot into the functioning robot; and
continuing work on the part with the group of robots while repairing the first robot.

18. A portion of an aircraft assembled according to the method defined by the instructions stored on the computer readable medium of claim 10.

19. An apparatus for coordinating operations of robots performing work on a part, the apparatus comprising:
a controller that is configured to assign a group of robots to a part; and
an interface that is configured to receive updates indicating work performed on the part via the group of robots;
the controller is configured to determine that a first robot from the group is unable to continue performing work at a first location of the part, direct removal of the first robot from the first location and the group while other robots of the group continue performing work on the part, add a functioning robot to the group at a second location of the part that the first robot was scheduled to occupy during the work, and direct the group to continue work on the part via the robots.

20. Fabricating a portion of an aircraft using the apparatus of claim 19.

* * * * *